US009511956B2

(12) United States Patent
Bianchi

(10) Patent No.: US 9,511,956 B2
(45) Date of Patent: Dec. 6, 2016

(54) PALLETIZER FOR A PLURALITY OF OBJECTS

(71) Applicant: SMI S.p.A., Bergamo (IT)

(72) Inventor: Emanuele Bianchi, Bergamo (IT)

(73) Assignee: SMI S.p.A, Bergamo (IT)

(*) Notice: Subject to any disclaimer, the term of this patent is extended or adjusted under 35 U.S.C. 154(b) by 0 days.

(21) Appl. No.: 14/470,887

(22) Filed: Aug. 27, 2014

(65) Prior Publication Data

US 2015/0063970 A1 Mar. 5, 2015

(30) Foreign Application Priority Data

Aug. 27, 2013 (IT) .............................. M12013A1414

(51) Int. Cl.

*B65G 57/00* (2006.01)
*B65G 61/00* (2006.01)
*B65G 57/24* (2006.01)

(52) U.S. Cl.

CPC ............. *B65G 57/005* (2013.01); *B65G 57/24* (2013.01); *B65G 61/00* (2013.01)

(58) Field of Classification Search

CPC .................................................... B65G 57/005
USPC ............ 414/799, 788.1, 788.4, 798.6, 792.7, 414/792.8, 792.9
See application file for complete search history.

(56) References Cited

U.S. PATENT DOCUMENTS 5,085,556 A * 2/1992 Ohtomi .................... B25J 9/023 414/744.3
5,098,254 A * 3/1992 Becicka ................. B65G 61/00 414/792.6
5,348,440 A * 9/1994 Focke ................... B65G 61/00 414/792.9
5,738,484 A * 4/1998 Taylor .................... B65G 61/00 294/67.2
6,601,490 B1 * 8/2003 Gross ..................... B26D 7/015 83/27
8,814,492 B2 * 8/2014 Perl ...................... B65G 57/035 414/790.8
2010/0316480 A1 * 12/2010 Perl ...................... B65G 57/035 414/802

* cited by examiner

*Primary Examiner* — Paul T Chin

(74) *Attorney, Agent, or Firm* — Cittone & Chinta LLP; Henry J. Cittone

(57) ABSTRACT

An apparatus for palletizing a plurality of objects, for example bottle packs or containers, is provided. A conveying and sorting system to form an ordered set of objects is provided. A handling system having a support column and movably arranged thereon a first handling member suitable to handle the ordered set of objects from a discharge position of the conveying and sorting system to a pallet arranged at a workstation is provided. A handling system having a support column and movably arranged thereon a second handling-suitable to handle a pallet from a pallet stack to the workstation and/or a cardboard flap from a respective stack to said workstation is provided.

18 Claims, 4 Drawing Sheets

103
10
M
M
119
120
120a
112
140
120b
141
27
29
31
31
P
32
5
6
36
36
F
29
31
13
14
11
15
15'
17
18
P

PALLETIZER FOR A PLURALITY OF OBJECTS

CROSS-REFERENCE TO RELATED APPLICATIONS

This application claims priority to Italian Patent Application MI2013A001414, filed Aug. 27, 2013, the disclosure of which is hereby incorporated by reference in its entirety.

FIELD OF THE INVENTION

The present invention relates to an apparatus for palletizing a plurality of objects, such as, e.g., bottle packs or other containers.

BACKGROUND

A palletizer is an apparatus that is used to stack and organize products (boxes, bottles, packs, bags, bales, etc.) on a pallet. It can be actuated manually or it can be automatic.

A pallet is a support, usually of wood, onto which the products are arranged for a subsequent transport. The pallets are produced so as to be able to be lifted by forklift trucks, cranes, or other transport systems. The products exit the factory onto these pallets, which are often wrapped and compacted with nylon or a film, so as to make the handling thereof and the subsequent transport easier and safer.

The palletizer allows a considerable saving in process costs; furthermore, it reduces dangers and labour for the operator.

However, a palletizing plant has the drawback of involving considerable overall dimensions. In fact, it is typically composed of:

- a transport and pre-sorting system of a plurality of objects, particularly packs of containers such as beverage bottles, enclosed in a special plastic film, conveying a plurality of ordered objects in the proximity of a pallet,
- a handling system of the plurality of ordered objects from the above-mentioned transport system to a pallet being processed,
- a withdrawing and handling system of a pallet from a pallet stack to the workstation,
- a withdrawing and handling system of a cardboard flap from a stack of flaps to the workstation. The latter system is preferred for arranging, on a first layer of objects arranged on the pallet, a dividing and supporting flap for a second layer of such objects.

In the known plants, all these operations are performed by independent apparatuses, causing considerable overall dimensions that hinders the access to the working area by an operator and the handling of the pallet stacks and the flaps by the so-called fork lift.

Therefore, the problem addressed by the present invention is to provide a palletizing plant having reduced overall dimensions and a facilitated access to the working area.

SUMMARY OF THE INVENTION

Such a problem is solved by a palletizer as set forth in the appended claims, the definitions of which are an integral part of the present disclosure.

Further characteristics and advantages of the present invention will be more clearly understood from the description of some embodiment examples, given herein below by way of illustrative, non-limiting example, with reference to the following figures:

DETAILED DESCRIPTION OF THE INVENTION

Figure 1:
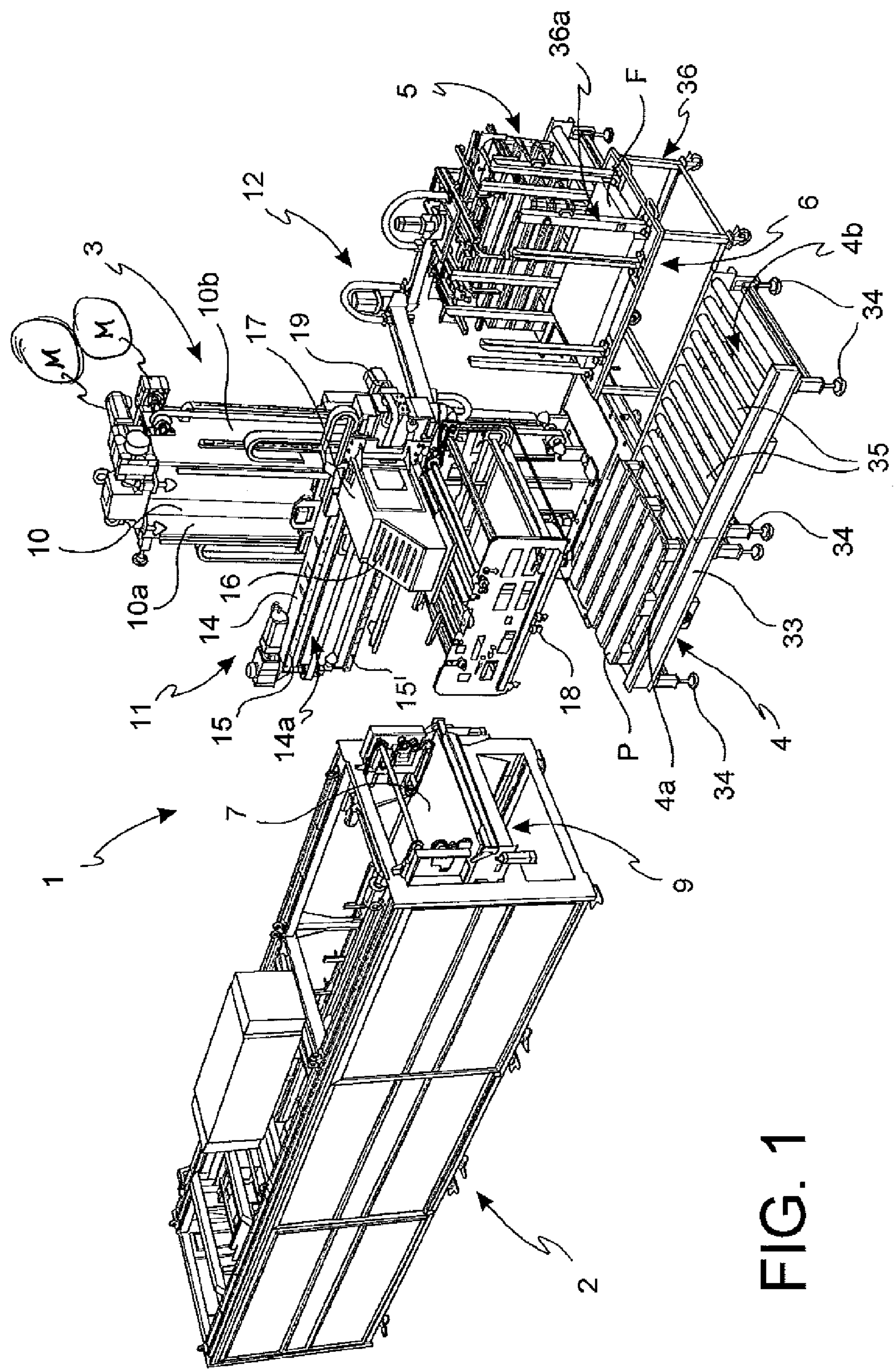
FIG. 1 represents a perspective view of a palletizing plant of the invention according to a first embodiment.

With reference to the figures, a palletizing plant according to the invention, generally indicated with the number 1, comprises:

- a conveying and sorting system 2 of a plurality of objects to form an ordered set of objects;
- a handling system 3 suitable to i) handle said ordered set of objects from the conveying and sorting system 2 on a pallet P in a workstation 4, ii) handle a pallet P from a pallet P stack to said workstation 4, iii) handle a cardboard flap F from a stack 6 of flaps F to said workstation 4.

The conveying and sorting system 2 of a plurality of objects is a system of the conventional type, known in the state of the art, and comprises a conveyor belt 7 handling the plurality of objects between a loading position 8 and a discharge position 9. Sorting means (not shown) of said objects according to a preset order so as to form said ordered set of objects are arranged along the path of the conveyor belt 7. Particularly, said sorting means arrange the plurality of objects according to the pattern with which they will have to be arranged onto the pallet P.

The plurality of objects is preferably a plurality of bottle packs. Each bottle pack typically group four or six bottles wrapped in a plastic film.

The handling system 3 comprises a support column 10 on which there are movably arranged:

- a first handling member 11 suitable to handle the ordered set of objects from the discharge position 9 of the conveying and sorting system 2 to the pallet P arranged on the workstation 4;
- a second handling member 12 suitable to handle a pallet P from a pallet stack 5 to the workstation 4 and/or a cardboard flap F from a respective stack 6 to said workstation 4.

The support column 10 typically is in the shape of a parallelepiped, and it is anchored to the ground by suitable anchoring means (not shown). The support column 10 comprises a first face 10*a* and a second face 10*b*, said faces 10*a*, 10*b* being arranged substantially at a right angle.

The first face 10*a* comprises first sliding support means for said first handling member 11 and the second face 10*b* comprises second sliding support means for said second handling member 12, wherein said first and second sliding support means define a sliding along a vertical axis of the handling members 11, 12.

Figure 2:
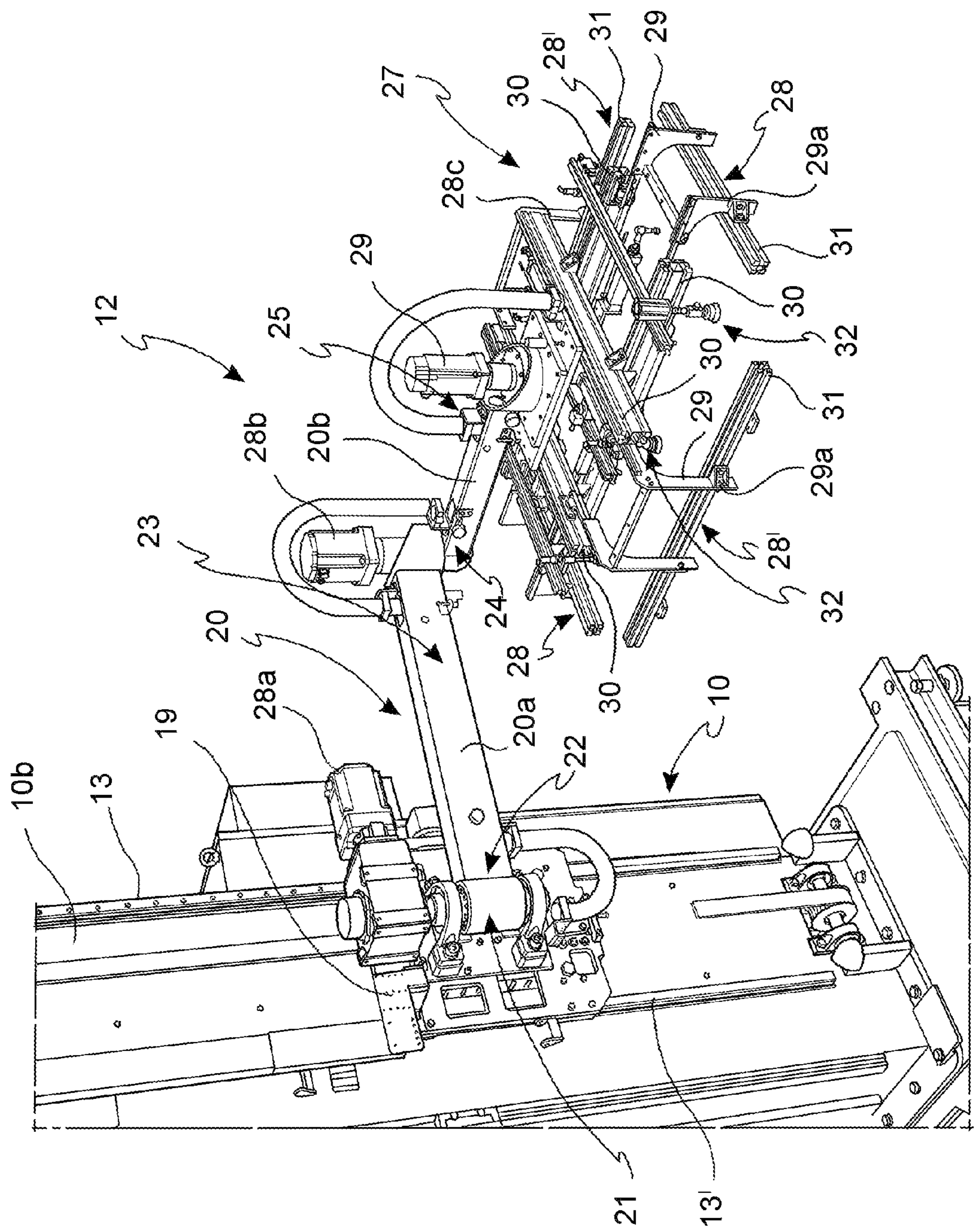
FIG. 2 represents a perspective view of a detail of the plant of FIG. 1.

In the embodiment shown in the figures, the first and second sliding support means comprise vertical guides 13, 13' (FIG. 2). Two parallel vertical guides 13, 13' form a track.

Suitable actuators M for the vertical translation of the handling members 11, 12 are also located on the support column 10. Such actuators can be an electric motor or a hydraulic or pneumatic actuator. The transmission of the motion to the handling members 11, 12 may occur by any transmission system that is known in this type of applications, such as a belt or chain system.

The first handling member 11 comprises a cart 14 slidable along a vertical axis on the guides 13, 13' arranged onto the first face 10*a* of the support column 10. To this aim, the cart 14 is provided with a suitable slide (not visible), which is slidable along the guides 13, 13'.

On the outer face 14*a*, opposite the face for sliding on the guides 13, 13', the cart 14 in turn comprises horizontal guides 15, 15' on which a transfer member 16 for the ordered set of objects is horizontally translatable.

The transfer member 16 comprises an arm 17 on the end of which proximal to the cart 14 a slide is mounted, being translatable on the guides 15, 15'.

The arm 17 supports a basket 18 designed for receiving the ordered set of objects, so as to transfer it from the discharge position 9 of the conveying and sorting system 2 to the pallet P, by a translation of the transfer member 16 along the guides 15, 15'.

The release of the ordered set of objects onto the pallet P occurs by virtue of release means that are present on the basket bottom. In substance, the objects are supported in the basket 18 by a plurality of bars mounted on a chain which allows the translation of the bars, thus opening the bottom of the basket 18.

The basket 18 further comprises lateral and front compaction means that allow a final sorting of the objects as they will have to be arranged on the pallet.

Anyhow, the basket 18 is of a conventional type; therefore, it will not be described in more detail.

The horizontal translation of the transfer member 16 on the cart 14 occurs by virtue of an actuator of the electric, hydraulic, or pneumatic type, operating by a transmission system which, for example, may be a belt or chain system.

The second handling member 12 comprises a sliding member 19 on which a slide suitable to slide on the vertical guides 13, 13' of the support column 10 is mounted.

An articulated arm system 20 is hinged by a hinge 21 on the sliding member 19.

The articulated arm system 20 comprises a first arm 20*a*, having a first end 22 rotatably associated to the hinge 21, and a second end 23; and a second arm 20*b*, having a first end 24, rotatably associated to the second end 23 of the first arm 20*a* by a hinge 26, and a second end 25.

A grip member 27 suitable to withdraw and release a pallet P or a cardboard flap F is rotatably associated with the second end 25 of the second arm 20*b*.

Figure 3:
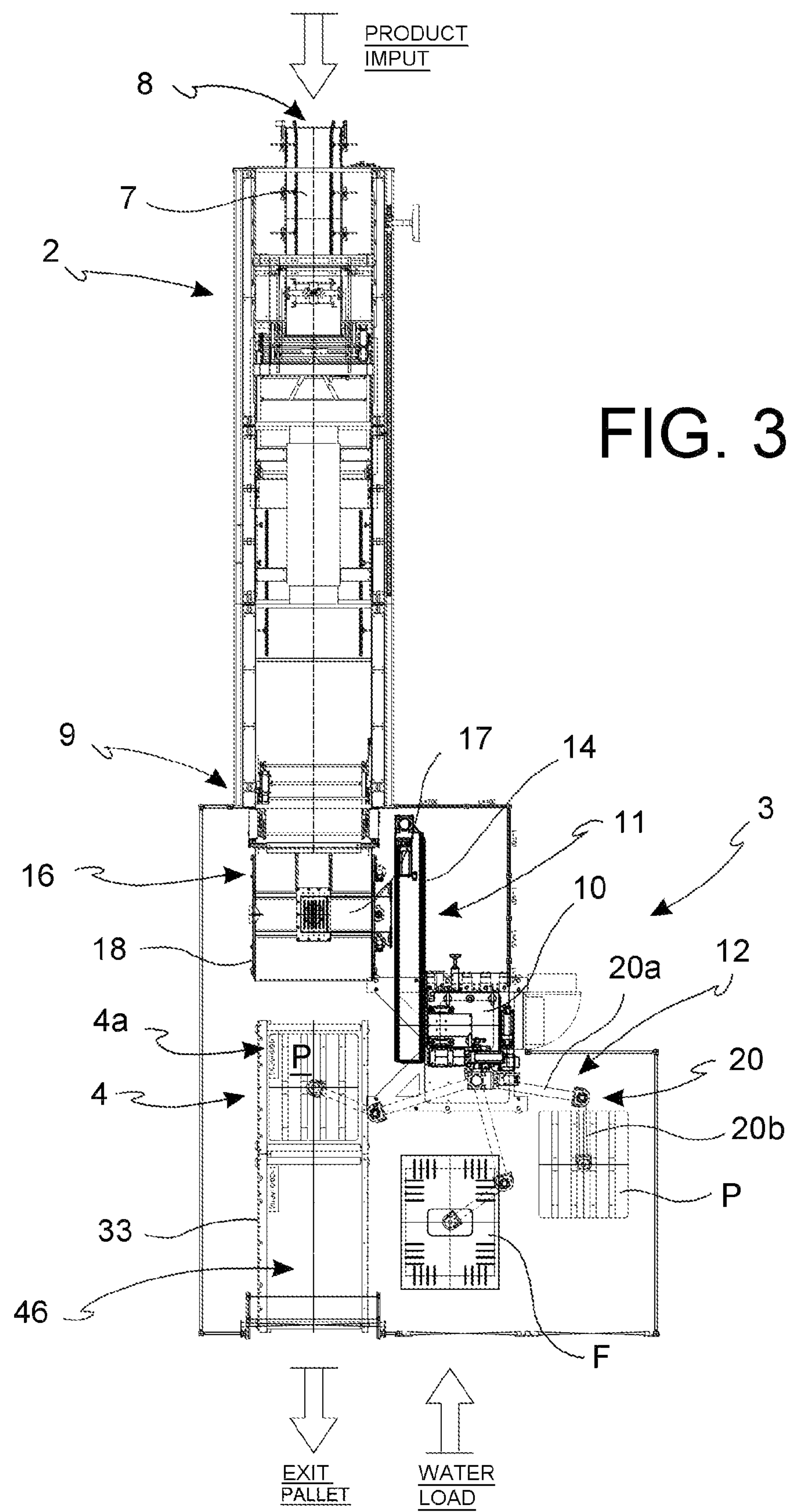
FIG. 3 represents a plan top view of the palletizing plant of FIG. 1.

Respective actuators 28*a*, 28*b*, 28*c*, preferably, but not limited to, an electric motor, provide for actuating the articulated arm system 20, so as to rotate the single arms 20*a*, 20*b* and the grip member 27 in all the possible positions according to preset angles as shown in FIG. 3, from which it is understood that the handling member 12 is capable of reaching all the operative positions for withdrawing a pallet P from the stack of pallets, withdrawing a flap F from the respective stack, and depositing the pallet and/or the flap onto the workstation 4.

The grip member 27 comprises a system with two pairs of claws 28, 28' arranged on the sides of a square or rectangle and actuatable by a suitable actuator, for example, an electric, pneumatic, or hydraulic actuator. Each pair of claws 28, 28' may translate approaching to or moving away from the center of the square or rectangle, so as to withdraw or release, respectively, a pallet P or a flap F.

Each pair of claws 28, 28' comprises a support member 29 slidable in special guides 30. Respective transversal bars 31 suitable to engage the edges of a pallet P are secured to the distal end 29*a* of the support member 29.

The grip member 27 further comprises suction means 32, in the form of a suction bell, suitable to suctioning and holding a cardboard flap F during the transfer from the respective stack to the workstation 4.

The workstation 4 comprises a support frame 33 rested on the ground by adjustable feet 34 and having a support plane composed of a plurality of idle-mounted rolls 35.

The support frame 33 comprises a processing portion 4*a*, which is intended to support the pallet P being processed, and a discharge portion 4*b*. The pallet P can be handled from the processing portion 4*a* to the discharge portion 4*b* by sliding it onto the rolls 35.

In a preferred embodiment, the stack 6 of cardboard flaps F is arranged on a table 36 comprising lateral containment members 36*a*, so as to hold the stack 6 in an ordered manner. In the embodiment of the figures, the lateral containment members 36*a* are obtained by means of vertical rods arranged in pairs in the proximity of the edges of the flaps F. In other embodiments, such lateral containment members 36*a* can be directly secured to the ground.

Figure 4:
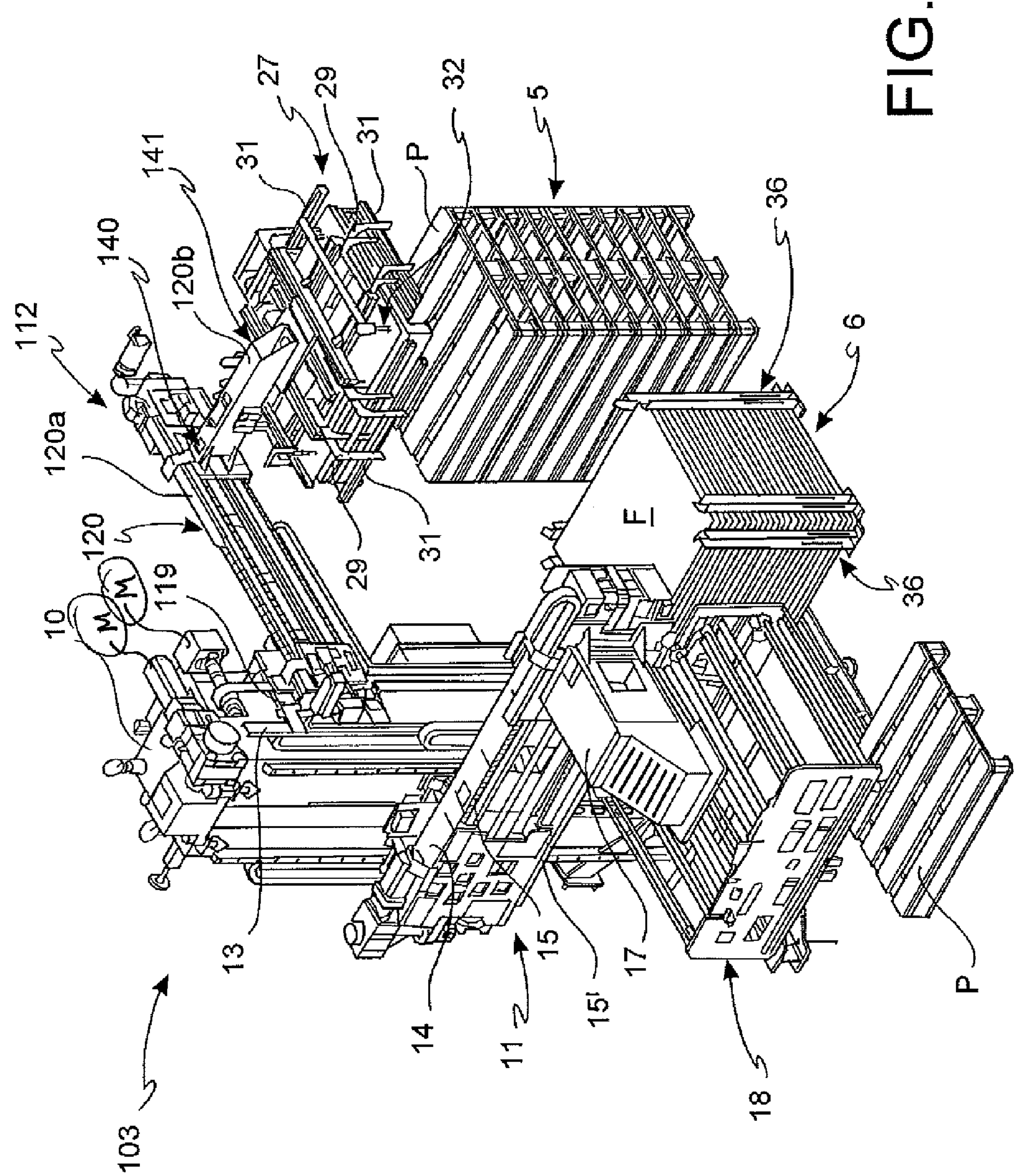
FIG. 4 represents a perspective view of a detail of the palletizing plant according to a different embodiment.

In a different embodiment, shown in FIG. 4, the handling system 103 comprises, similarly to the one described above, a support column 10 on which there are movably arranged:

- a first handling member 11 suitable to handle the ordered set of objects from the discharge position 9 of the conveying and sorting system 2 to the pallet P arranged on the workstation 4;
- a second handling member 112 suitable to handle a pallet P from a pallet stack 5 to the workstation 4 and/or a cardboard flap F from a respective stack 6 to said workstation 4.

In this embodiment, the support column 10 and the first handling member 11 are completely similar to those described above; therefore, the same numbers are used to identify the various parts.

Vice versa, the second handling member 112 comprises, in place of the articulated arm system, a Cartesian system 120.

The Cartesian system 120 is mounted onto a sliding member 119 comprising a slide slidable on the vertical guides 13, 13' of the support column 10.

The Cartesian system 120 comprises a first arm 120*a*, which is arranged horizontally and slidable in a vertical direction integral to the sliding member 119.

A second arm 120*b* is slidably associated to the first arm 120*a*. The second arm 120*b* comprises a proximal end 140, to which a slide is associated, which is slidable on special horizontal guides arranged on the first arm 120*a*, and a distal end 141.

The distal end 141 of the second arm 120*b* is secured to a grip member 27 completely similar to the one described above; therefore, the same numbers are used to identify equal parts.

Both the first arm 120*a* and the second arm 120*b* are handled by means of actuators, for example, electric, pneumatic, or hydraulic actuators, by a transmission system of a conventional type, such as a belt or chain system.

In both the embodiments described above, the palletizing plant 1 according to the invention may comprise a drive and control unit driving in an automatized manner the handling both of the ordered set of objects and of the pallet P and the flap F, by the handling system 3, 103.

The operation of the palletizing plant 1 according to the invention is apparent from what has been stated above. First of all, the second handling member 12, 112 provides for withdrawing a pallet P from the respective stack 5 and arranging it onto the workstation 4. This operation is performed by coordinating the vertical movements of the handling member 12, 112 on the support column 10 with the horizontal movements of the articulated arm system 20 or the Cartesian system 120.

At this point, the first handling member 11 provides for withdrawing, by the basket 18, an ordered set of objects from the discharge position 9 of the conveying and sorting system 2 up to the pallet 9 located on the workstation 4.

If necessary, the second handling member 12, 112 provides for withdrawing a flap F from the respective stack 6 and arranging it on the ordered set of objects already arranged on the pallet P, so as to create a dividing surface. Then the first handling member 11 will repeat the withdrawing and deposition operation of a second ordered set of objects on the flap F or, if the latter has not been arranged, directly on the ordered set of objects already located on the pallet P.

At the end of such operation, the pallet P being processed is moved away from the processing portion 4*a* of the workstation 4 by making it to slide on the rolls 35 and bringing it on the discharge portion 4*b*, so as to be able to be withdrawn and moved away by a forklift truck or another transport means.

As it shall be noticed from what has been described above, the palletizing plant 1 according to the invention has the relevant advantage to minimize the overall dimensions of the various apparatuses. This result was achieved by associating both the first handling member 11, for handling the ordered set of objects, and the second handling member 12, 112, for handling the pallets P and the cardboard flaps F to a single support column 10.

The best optimization of the spaces is achieved in the first embodiment comprising an articulated arm system 20 for the handling of pallets and flaps, since the articulated arm system 20 allows arranging the workstation 4 at a more retracted position with respect to the line of the pallet stack 5 and of the stack 6 of flaps.

It is apparent that only some particular embodiments of the present invention have been described, to which those skilled in the art will be able to make all the modifications that are necessary for the adaptation thereof to particular applications, without for this departing from the protection scope of the present invention.

The invention claimed is:

1. A palletizing plant comprising:

(a) a conveying and sorting system of a plurality of objects to form an ordered set of objects;

(b) a handling system, wherein said handling system is composed of a support column on which there are movably arranged:

(i) a first handling member suitable to handle the ordered set of objects from a discharge position of the conveying and sorting system to a pallet arranged at a workstation and;

(ii) a second handling member suitable to handle a pallet from a pallet stack to the workstation or a flap of cardboard from a respective stack to said workstation wherein the first handling member comprises a cart slidable along a vertical axis, said cart comprising horizontal guides on which a transfer member for the ordered set of objects is horizontally translatable.

2. The palletizing plant according to claim 1, wherein the support column comprises a first face and a second face, said faces being arranged substantially at a right angle, and wherein said first face comprises first sliding support means for said first handling member and said second face comprises second sliding support means for said second handling member, said first and second sliding support means defining a sliding of the handling members along a vertical axis.

3. The palletizing plant according to claim 2, wherein the first and second sliding support means comprise vertical guides.

4. The palletizing plant according to claim 1, wherein actuators for the vertical translation of the handling members are placed on the support column.

5. The palletizing plant according to claim 1, wherein said transfer member comprises an arm on the end of which proximal to the cart a slide, being translatable on the guides, is mounted, and wherein the arm supports a basket designed for receiving the ordered set of objects, so as to transfer it from the discharge position of the conveying and sorting system to the pallet, by a translation of the transfer member along the guides.

6. The palletizing plant according to claim 1, wherein the second handling member comprises a sliding member on which a slide suitable to slide on vertical guides of the support column is mounted.

7. The palletizing plant according to claim 6, wherein an articulated arm system is hinged onto the sliding member by a hinge.

8. The palletizing plant according to claim 7, wherein the articulated arm system comprises a first arm, having a first end rotatably associated to the hinge, and a second end; and a second arm, having a first end, rotatably associated to the second end of the first arm by a hinge, and a second end, a grip member, suitable to withdraw and release a pallet or a flap, being rotatably associated to the second end of the second arm.

9. The palletizing plant according to claim 8, wherein respective actuators provide for actuating the articulated arm system, so as to rotate the single arms and the grip member according to preset angles.

10. The palletizing plant according to claim 7, wherein the grip member comprises a system with two pairs of claws arranged on the sides of a square or rectangle and actuatable by a suitable actuator, each pair of claws being able to translate approaching to or moving away from the center of the square or rectangle, so as to withdraw or release, respectively, a pallet or a flap.

11. palletizing plant according to claim 10, wherein each pair of claws comprises a support member slidable on suitable guides, respective transversal bar that are suitable to engage the edges of a pallet being secured at the distal end of the support member.

12. The palletizing plant according to claim 6, wherein the second handling member comprises a Cartesian system, said Cartesian system being mounted onto said sliding member.

13. The palletizing plant according to claim 12, wherein said Cartesian system comprises a first arm, which is arranged horizontally and slidable in a vertical direction integral to the sliding member, a second arm being slidably associated to the first arm, wherein said second arm comprises a proximal end, to which a slide that is slidable on special horizontal guides arranged on the first arm is associated, and a distal end that is secured to a grip member suitable to withdraw and release a pallet or a flap.

14. The palletizing plant according to claim 1, wherein the workstation comprises a support frame having a support plane composed of a plurality of idle-mounted rolls.

15. The palletizing plant according to claim 14, wherein the support frame comprises a processing portion, which is intended to support the pallet being processed, and a discharge portion.

16. The palletizing plant according to claim 1 wherein the stack of cardboard flaps is arranged on a table comprising lateral containment members suitable to hold the stack in an ordered manner.

17. The palletizing plant according to claim 1, comprising a drive and control unit controlling in an automatized manner the handling of the ordered set of objects, of the pallet and of the flap, by the handling system.

18. The palletizing plant according to claim 1, wherein the workstation is arranged in a rear position with respect to the line of the stack of pallet and the stack of flaps.

* * * * *